United States Patent [19]

Tsuno et al.

[11] Patent Number: 5,028,162
[45] Date of Patent: Jul. 2, 1991

[54] METAL-CERAMIC JOINED COMPOSITE BODIES

[75] Inventors: Nobuo Tsuno, Kasugai; Takashi Ando; Yoshizumi Nakasuji, both of Nagoya, all of Japan

[73] Assignee: NGK Insulators, Ltd., Japan

[21] Appl. No.: 312,667

[22] Filed: Feb. 21, 1989

[30] Foreign Application Priority Data

Feb. 29, 1988 [JP] Japan ................................ 63-44211
Mar. 22, 1988 [JP] Japan ................................ 63-65864

[51] Int. Cl.⁵ .............................................. F16D 1/02
[52] U.S. Cl. .................................... 403/30; 403/41; 403/272; 403/404
[58] Field of Search ................ 403/30, 272, 404, 41

[56] References Cited

U.S. PATENT DOCUMENTS

| | | | |
|---|---|---|---|
| 2,945,457 | 7/1960 | Avery et al. | 403/41 X |
| 2,972,808 | 2/1961 | Litton | 403/272 X |
| 3,302,961 | 2/1967 | Franklin | 403/272 |
| 4,325,647 | 4/1982 | Maier et al. | 403/404 X |
| 4,614,453 | 9/1986 | Tsuno et al. | 403/30 |
| 4,679,960 | 7/1987 | Mizuhara | 403/404 X |
| 4,722,630 | 2/1988 | Fang | 403/272 X |
| 4,723,863 | 2/1988 | Takagi et al. | 403/272 |

FOREIGN PATENT DOCUMENTS

| | | |
|---|---|---|
| 0142334 | 5/1985 | European Pat. Off. . |
| 0215554 | 3/1987 | European Pat. Off. . |
| 0233772 | 8/1987 | European Pat. Off. . |
| 0195640 | 9/1986 | European Pat. Off. . |

Primary Examiner—Dennis L. Taylor
Assistant Examiner—Arlen L. Olsen
Attorney, Agent, or Firm—Parkhurst, Wendel & Rossi

[57] ABSTRACT

A metal-ceramic joined, composite body comprises a metallic member and a ceramic member. The metallic member and the ceramic member are provided with a recess and a projection, respectively, and are integrally joined by inserting the projection into the recess. The recess of the metallic member is provided with a stepped portion to increase an inner diameter of the recess at an opening portion thereof, and a brazing metal is interposed at least in a gap between the stepped portion and the projection of the ceramic member. Alternatively, a groove is provided over substantially the entire periphery of the projection of the ceramic member in vicinity of an end of a joined portion between the metallic member and the ceramic member, and a brazing metal is interposed at least between an edge of the groove and the recess of the metallic member. Besides the above, the axial length $L_2$ of the joined portion and the diameter D of the projection may be set to satisfy the following relationship:

$$0.2 \leq \frac{L_2}{D} \leq 0.39$$

6 Claims, 9 Drawing Sheets

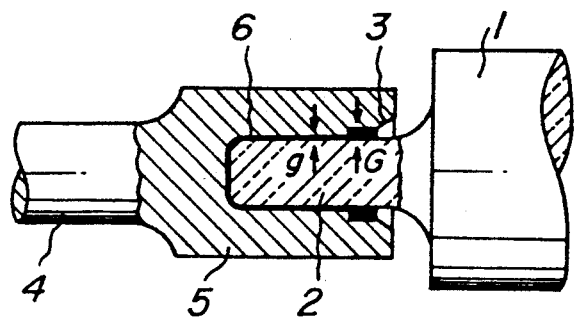
FIG_1a
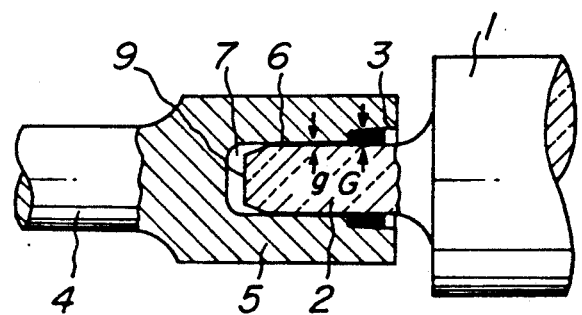
FIG_1b
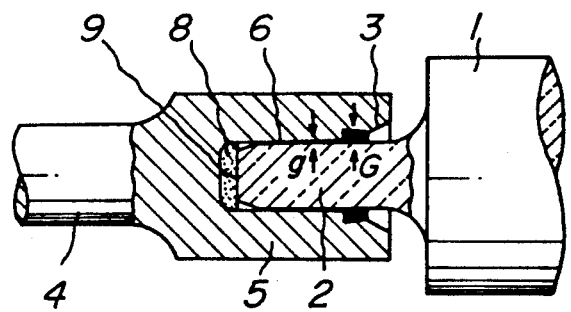
FIG_1c
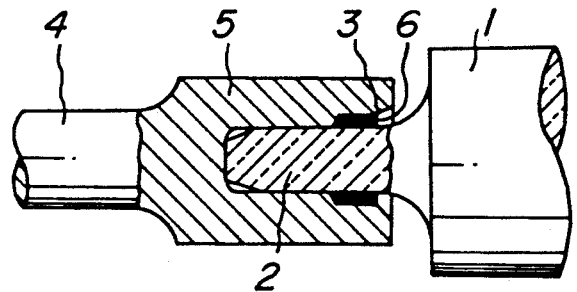
FIG_1d

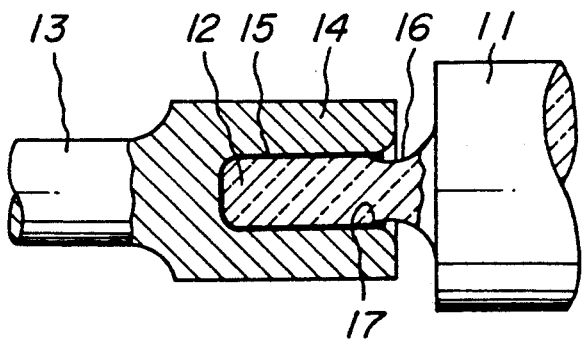
FIG._2a
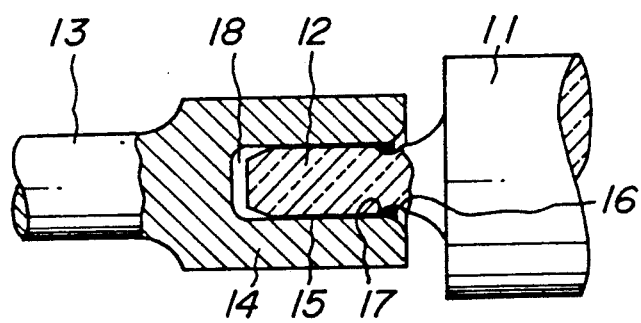
FIG._2b
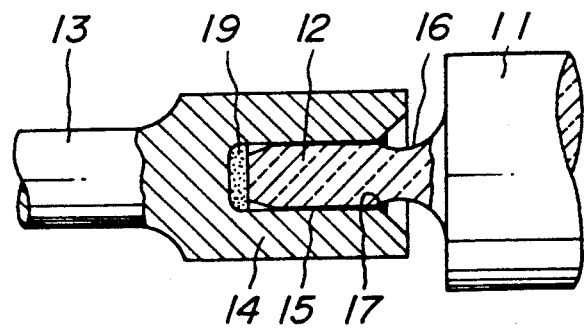
FIG._2c
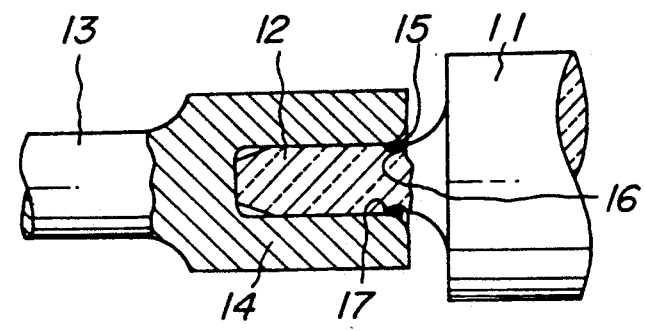
FIG._2d

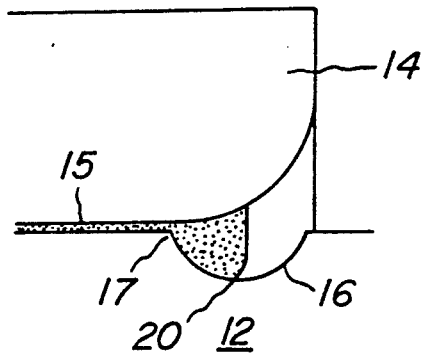
FIG_3a
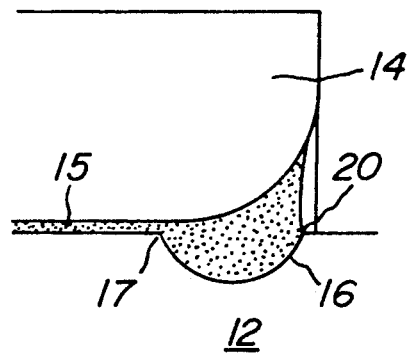
FIG_3b

FIG_4a
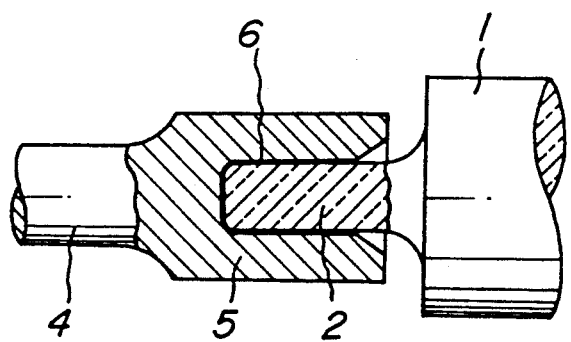
FIG_4b
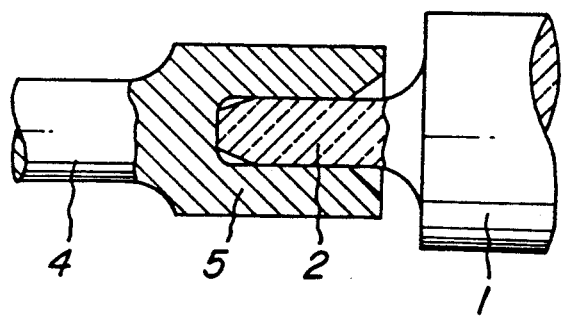

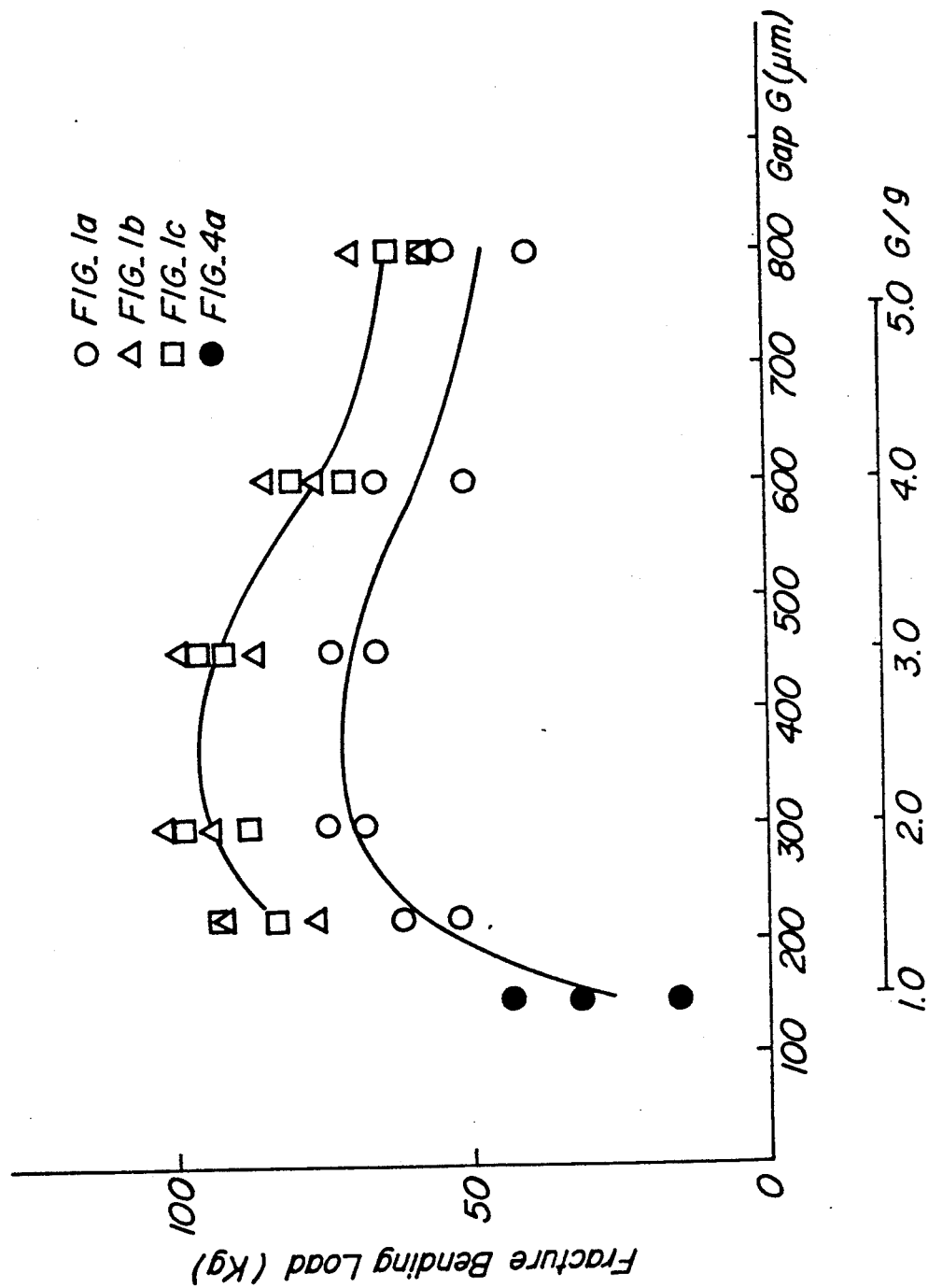

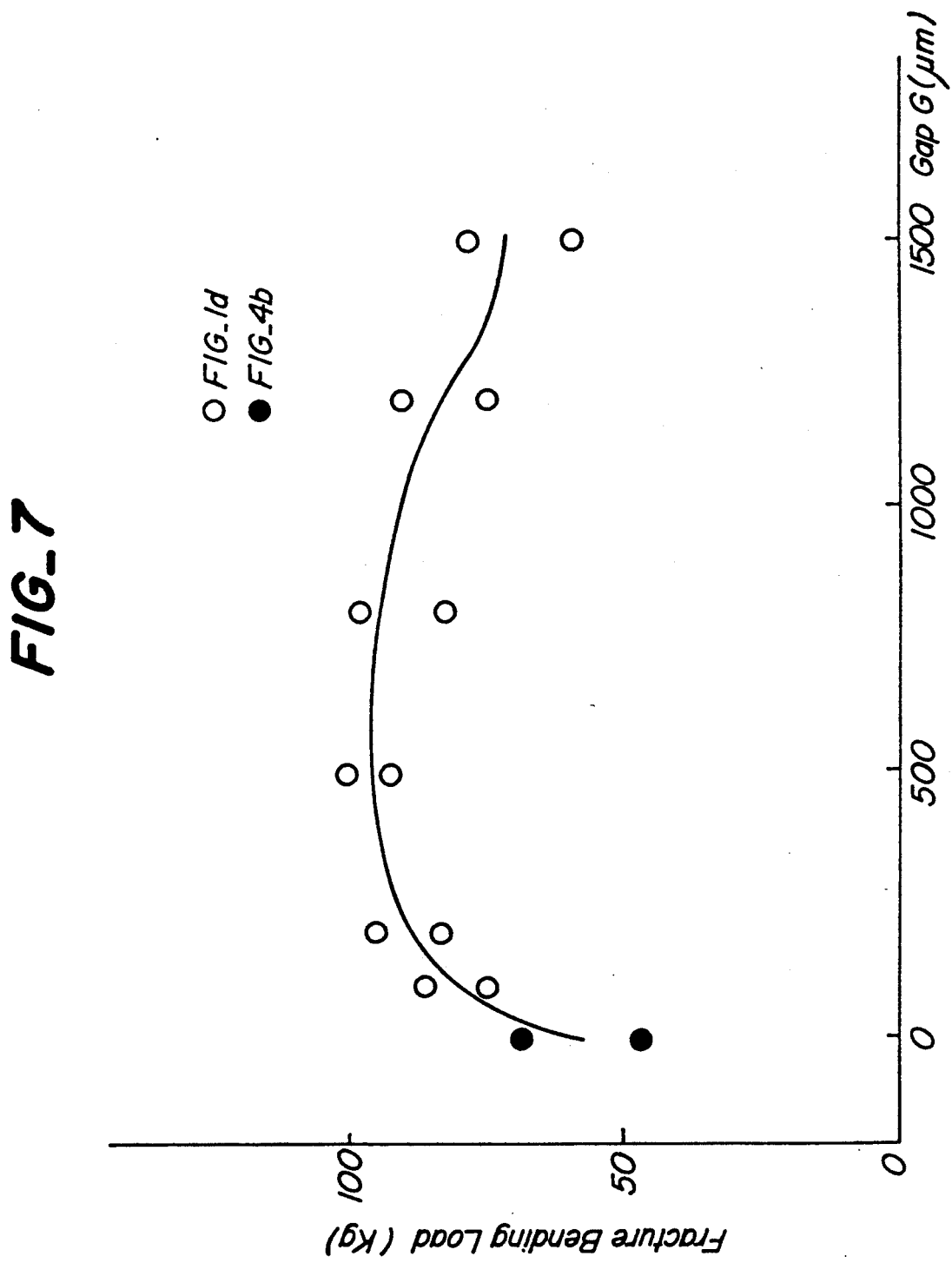
FIG._7

FIG_8a
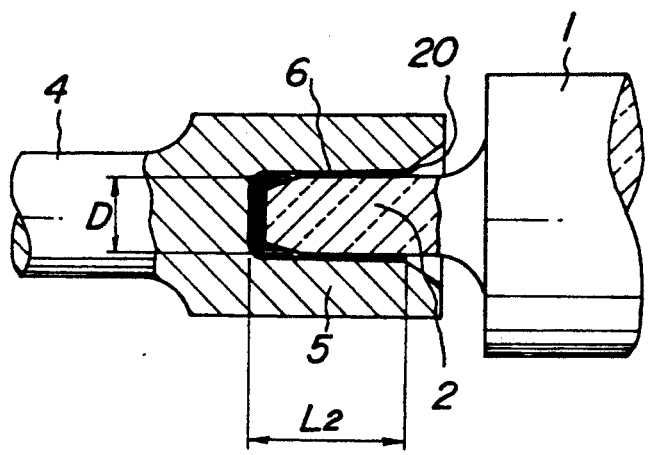
FIG_8b
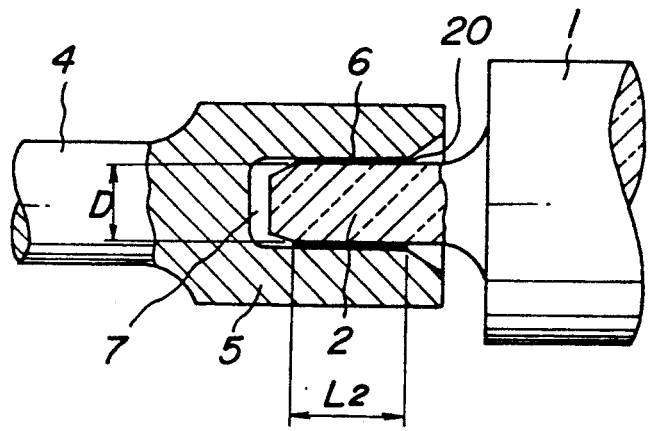
FIG_8c
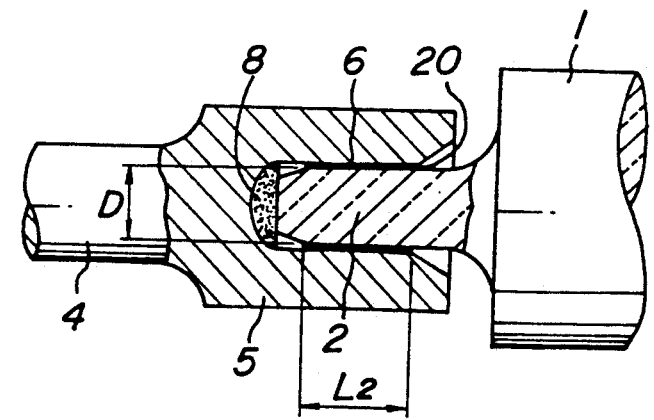

METAL-CERAMIC JOINED COMPOSITE BODIES

BACKGROUND OF THE INVENTION (1) Field of the Invention:

The present invention relates to metal-ceramic joined, composite bodies in which a ceramic member is integrally joined to a metallic member.

(2) Related Art Statement:

Since ceramic materials such as zirconia, silicon nitride, and silicon carbide have excellent mechanical strength, heat resistance, and wear resistance, they have been put into practical use as high temperature structural materials or wear-resistant materials for gas turbine engine parts, internal combustion engine parts, etc. However, since ceramics are generally hard and brittle, they are inferior to metallic materials with respect to shapability and processability. Further, since ceramics have poor toughness, they have low resistance against impact forces. For this reason, it is difficult to form mechanical parts such as engine parts from ceramic materials only. In many cases, such ceramic materials are generally used in the form of a composite structure in which a metallic member is joined to a ceramic member.

When a metallic member is to be joined to a ceramic member, a joined body is generally obtained by shrinkage fitting a projection of the ceramic member into a recess of the metallic member or by brazing them. In this case, stress is likely to be concentrated at an end of a joined portion between the outer surface of the projection of the ceramic member and the inner surface of the recess of the metallic member. Consequently, the strength of the joined structure against bending or twisting is decreased, and the ceramic member can be broken.

In the case of the metal-ceramic joined composite body in which a projection formed at the ceramic member is integrally joined to the recess of the metallic member, in order to prevent stress concentration at the end of the joined composite body, Japanese Patent Application Laid-open No. 59-159,408 discloses a joined structure in which a groove is formed in the outer peripheral portion of the projection. Joining is effected by shrinkage fitting as a mechanical joining way, such that an end of the groove is located at an end of a joined portion between the projection of the ceramic member and the recess of the metallic member.

However, even when this structure is attained by the above-mentioned mechanical joining, an edge of the groove, provided over the entire periphery of the projection of the ceramic member, contacts the recess of the metallic member, and excessive stress concentration occurs there. Consequently, the bending strength and twisting strength of the joined composite body are decreased, and the ceramic member is likely to be broken.

Even if the edge of the groove is designed as an angular edge or a rounded edge, stress concentration may still occur there. For this reason, bending strength and twisting strength of the joined composite body also decrease, and the ceramic member is likely to be broken. Further, when the joined composite body is used in an atmosphere such as a combustion gas, the end of the joined portion is exposed to the combustion gas, so that durability of the joined composite body decreases.

Further, there have been known metal-ceramic composite bodies in which an outer surface of a projection of a ceramic member is joined to an inner surface of a recess of a metallic member by brazing, and the projection is firmly fixed, in the thus joined portion, to a brazing metal present between the outer surface of the projection of the ceramic member and the inner surface of the recess of the metallic member through chemical joining over the entire surface of the projection.

Consideration is now made of a case where a projection of a ceramic member is to be joined to a recess of a metallic member by brazing. When temperature is lowered from a solidifying point of the brazing metal to room temperature, shrinkage amounts of the metallic member or the brazing metal are generally greater, since there is a difference in the coefficient of thermal expansion, i.e., since the metallic member or the brazing metal has a greater coefficient of thermal expansion while that of the ceramic member is smaller. However, as mentioned above, in the structure in which the projection of the ceramic member is firmly fixed to the brazing metal over the entire contact surfaces between them through chemical joining, the brazing metal is firmly fixed to the ceramic member due to shrinkage of the metallic member or the brazing metal during cooling. Consequently, the brazing metal cannot slip, relative to the ceramic member at their joining interface so that shrinking forces of the metallic member or the brazing metal act upon the ceramic member and excessive tensile stress occurs in the ceramic member. Further, no sufficient investigations have been made upon the relationship between the surface of the tip end of the projection and the bottom surface of the recess. The relationship between the diameter and the length of the joined portionship has not fully been considered.

Therefore, tensile stress greatly concentrates particularly upon the end of the joined portion of the ceramic member, which reduces resistance of the joined composite body against bending or twisting, and deteriorates reliability.

SUMMARY OF THE INVENTION

It is an object of the present invention to solve the above-mentioned problems and to provide metal-ceramic joined composite bodies which can readily be produced and which have high joining strength.

It is another object of the present invention to overcome the above-mentioned problems, and provide metal-ceramic joined, composite bodies which have extremely high joining strength both at room temperature and at elevated temperatures.

According to a first aspect of the present invention, there is a provision of metal-ceramic joined, composite body comprising a metallic member provided with a recess, a ceramic member provided with a projection, the metallic member and the ceramic member being integrally joined together by inserting the projection into the recess, wherein a stepped portion is provided in the recess of the metallic member to increase an inner diameter of the recess at the opening portion. A brazing metal is interposed at least in a gap between the stepped portion and the projection of the ceramic member.

According to a second aspect of the present invention, there is a provision of a metal-ceramic joined, composite body comprising a metallic member provided with a recess, and a ceramic member provided with a projection, the metallic member and the ceramic member being integrally joined together by inserting the projection into the recess, wherein a groove is provided substantially all over the entire periphery of the projection of the ceramic member in the vicinity of an end of a joined portion between the metallic member and the ceramic member. A brazing metal is provided in the groove such that the brazing metal is interposed at least between an edge of the groove and the recess of the metallic member.

A third aspect of the present invention is directed to a metal-ceramic joined, composite body in which a projection formed on a ceramic member is inserted into a recess formed in a metallic member, and the outer surface of the projection is integrally joined to the inner surface of the recess by brazing. The joined, composite body is characterized in that the joining is effected to satisfy the following relationship:

$$0.2 \leq \frac{L_2}{D} \leq 0.39$$

in which $L_2$ and D are the axial length of the joined portion between the recess of the metallic member and the projection of the ceramic member and the outer diameter of the projection, respectively.

The end of the joined portion of the joined composite body used herein means an end of the joined portion between the projection of the ceramic member and the brazing metal in the vicinity of the opening of the recess of the metallic member. As shown in FIG. 3, it may be that the end 20 of the joined portion is located at or outside the groove of the projection.

In the above construction, the groove is formed over the entire periphery of the projection of the ceramic member in the vicinity of the end of the joined portion, and the brazing metal is interposed at least between the edge of the groove and the recess of the metallic member. Alternatively, the stepped portion is provided to increase the inner diameter of the recess of the metallic member at the opening portion thereof, and the brazing metal is interposed at least between the stepped portion and the projection of the ceramic member on joining. Thus, stress concentration upon the ceramic member is mitigated by a cushioning action of the brazing metal. Accordingly, a high reliability, metal-ceramic joined, composite body which is hardly broken due to bending or twisting forces can be obtained. In addition, when the groove is formed substantially over the entire periphery of the projection of the ceramic member in the vicinity of the end of the joined portion, the brazing metal is interposed at least between the edge of the groove and the recess of the metallic member, and the brazing metal is arranged in the groove. The ceramic member is prevented from slipping out of the recess of the metallic member by the brazing metal present in the groove. Thus, the joined composite body has improved reliability against slip-out.

Furthermore, when the joining between the metallic member and the ceramic member is limited to between the outer peripheral surface of the projection of the ceramic member and the inner peripheral surface of the recess of the metallic member, the surface of the tip end of the projection of the ceramic member is prevented from being joined to the bottom surface of the recess of the metallic member by providing, therebetween, a space, or an intermediate member or a film which is made of a low elasticity material having no joinability to the brazing metal. Stress concentration due to residual stress at the tip end of the projection of the ceramic member and at the end of the joined portion is mitigated. Consequently, a high reliability, metal-ceramic joined, composite body which is hardly broken due to bending or twisting forces can be obtained. Such joining is thus preferred.

When the joining is effected by brazing, the brazing metal is preferably present between the groove formed in the projection of the ceramic member and the recess of the metallic member or between the projection of the ceramic member and the stepped portion of the recess of the metallic member. For in this case, since the brazing metal becomes thicker, stress concentration which would occur at the end of the joined portion of the ceramic member due to a difference in the amount of shrinkage between the metallic member and the ceramic member during cooling from the brazing temperature can be reduced. Thus, such joining is also preferred.

When the outer peripheral surface of the projection and the inner peripheral surface of the recess of the metallic member are brazed together at the contacting portion only, residual stress occurring at the end of the joined portion can be mitigated. Further, since the brazing metal reacts with the ceramic member and the metallic member, the firm, joined portion can be formed between the members. Therefore, the joining strength is improved in a range from room temperature to high temperatures. Moreover, the shrinkage fitting effect can additionally be obtained when cooling is effected from the joining temperature. Thus, high strength can be obtained. Therefore, a preferable effect can be obtained in this case.

In construction of the third aspect of the present invention, stress concentration occurring at the end of the joined portion, due to difference in thermal expansion between the ceramic member and the metallic member, can be reduced by selecting the optimum joining length $L_2$ depending upon the diameter D of the projection of the ceramic member. As a result, the bending and twisting strength of the joined, composite body increases, thus enhancing reliability. The reason why the value of $L_2/D$ is not less than 0.2 and not more than 0.39 is that if it is more than 0.39, as clear from examples mentioned later, the fracture bending load decreases such that the desired strength cannot be obtained. Further, if it is less than 0.2, the brazing area decreases to decrease joining strength and to allow easy slip-out of the projection of the ceramic member from the recess of the metallic member.

The joining length $L_2$ is a length of a brazed portion between the inner peripheral surface of the recess of the metallic member and the outer peripheral surface of the projection of the ceramic member.

The same brazing processes and the brazing metals, as described in connection with the first and second aspects of the present invention, may be appropriately selected for the third aspect of the invention.

These and other objects, features, and advantages of the invention will be appreciated upon reading the following description of the invention when taken in conjunction with the attached drawings, with the understanding that some modifications, variations and changes of the same could be made of a skilled person in the art to which the invention pertains without departing from the spirit of the invention nor the scope of claims appended hereto.

BRIEF DESCRIPTION OF THE ATTACHED DRAWINGS

For a better understanding of the invention, reference is made to the attached drawings, wherein:

FIGS. 1a through 1d and FIGS. 2a through 2d are partially sectional views of embodiments of the metal-ceramic joined composite bodies according to the first and second aspects of the present invention;

FIGS. 3a and 3b are partially sectional, enlarged views of grooves in the metal-ceramic joined, composite bodies according to the second aspect of the present invention;

FIGS. 4a and 4b are partially sectional views of metal-ceramic joined, composite bodies as comparative examples;

FIGS. 6 and 7 are diagrams showing results with respect to embodiments according to the first aspect of the present invention;

FIGS. 8a through 8c are partially sectional views of embodiments of the metal-ceramic joined composite bodies according to the third aspect of the present invention.

DETAILED DESCRIPTION OF THE INVENTION

Figure 5:
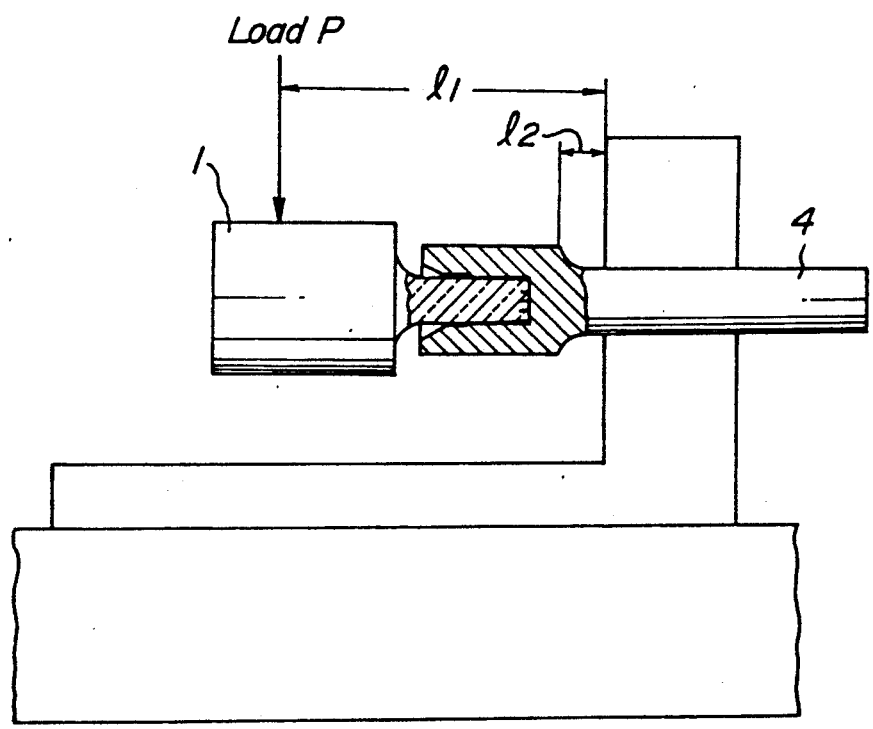
FIG. 5 is a view illustrating a bending tester used for testing.

The joined portion is limited to the abovementioned position by forming a thin film made of a material having no joinability to the brazing metal on the tip end surface of the projection provided on the ceramic member, by providing the intermediate member made of such a material or a space between the bottom surface of the recess of the metallic member and the tip end surface of the projection of the ceramic member, or by combining these measures.

As a material having no joinability to the brazing metal, mention may be made of graphite by way of example. A film of graphite can easily be formed on the tip end surface of the projection by brushing or spraying a graphite particle-suspended liquid thereonto or by immersing a graphite particle-suspended liquid thereinto. As the intermediate member, low elasticity materials such as sliver, felt, web, web sintered body, and woven cloth composed of graphite fibers may preferably be used singly or in combination.

When the intermediate member is interposed between the tip end surface of the projection and the bottom surface of the recess, the positional limitation of the joined portion can easily and assuredly be effected. Therefore, residual stress which would occur at the end of the joined portion of the ceramic member can be reduced and controlled after the joining, and it is possible to increase the joining strength and to decrease variations thereof.

The interposition of the intermediate member made of the low elasticity material is not only to prevent joining between the brazing metal and the bottom surface of the recess, but also to prevent mutual interference between the tip end surface of the projection and the bottom surface of the recess, which would occur due to difference in the amount of shrinkage between the ceramic member and the metallic member during cooling from the joining temperature. Thus, this serves to prevent occurrence of excess residual stress at the joined portion, and to effectively penetrate the molten brazing metal into a gap between the outer peripheral surface of the projection and the inner peripheral surface of the recess.

As the brazing metal used for joining the ceramic member to the metallic member, use is preferably made of an active brazing metal containing an active metal element capable of being chemically joined to the ceramic member. As the brazing metal, use may be made of a brazing alloy containing an active metal element, or a brazing metal in which a metal substrate is coated with an active metal element. In view of easy adjustment of the addition amount of the active metal to the brazing metal, handling easiness, or production easiness, it is preferable to use a brazing metal in which the metal substrate is coated with the active metal element. It is more preferable to use a brazing metal in which an active metal element is vapor deposited upon a metal substrate. As such an active metal element, at least one metallic element selected from the group consisting of Zr, Ti, Ta, Hf, V, Cr, La, Sc, Y and Mo is preferably used when the ceramic member to be joined is made of a ceramic material containing at least a nitride and/or a carbide. When the ceramic member to be joined is made of an oxide type ceramic, at least one metallic element selected from the group consisting of Be, Zr and Ti is preferably used.

Since the above active brazing metals have good wettability to the ceramic member, it is unnecessary to effect a special pretreatment such as a metallizing treatment for the ceramic member. As to the metallic member, its wettability is improved by plating it with Ni. Therefore, since the molten brazing metal can be penetrated into a position to be joined by utilizing capillary action, the brazing can be effected which suffers few defects such as bubbles or shrinkage cavities only by controlling the gap formed at the joining position, without preliminarily arranging the brazing metal at this joining position.

Even when the brazing is to be effected by using a brazing metal containing no active metal, similar effects as in the case of the brazing metal containing the active metal can be obtained by providing a metallizing layer at the position to be joined on the outer peripheral surface of the projection of the ceramic member, plating the metallizing layer with Ni, and preferably, further plating a position to be joined of the inner peripheral surface of the recess of the metallic member with Ni. In this case, since the joining is not effected at the tip end surface of the projection having no metallizing layer because of no reaction between the brazing metal and the ceramic member, a gap is formed between the tip end surface of the projection and the bottom surface of the recess. Furthermore, wettability between the inner surface of the recess and the brazing metal is preferably improved by plating the joining position on the inner surface of the recess of the metallic member with Ni.

Moreover, when the brazing is effected while an active metal foil is arranged between the outer peripheral surface of the projection of the ceramic member and the inner peripheral surface of the recess of the metallic member at a joining position and a brazing metal containing no active metal is placed between the bottom surface of the recess of the metallic member and the tip end surface of the projection of the ceramic member, similar effects as when the active brazing metal is used can be obtained.

When the joining is substantially effected by utilizing mechanical joining such as press fitting, shrinkage fitting, or expansion fitting, while the brazing metal is located at least between the edge of the groove provided around the entire periphery of the projection in the vicinity of the end of the joined portion and the recess of the metallic member, excess stress concentration at the edge of the groove which would occur through contacting between the edge of the groove and the recess of the metallic member when the joining is effected by the mechanical joining only is reduced such that a corrosive gas such as a high temperature combustion gas can be prevented from entering the joining interface. Thus, such a joining is preferred.

In the above-mentioned process in which, when the joining is substantially effected by utilizing the mechanical joining, the brazing metal is interposed between the edge of the groove and the recess of the metallic member, the brazing metal arranged at the groove is melted and penetrated between the edge of the groove and the recess by heating the constituent members up to the melting point of the brazing metal. Thus, the construction according to the present invention can be attained more easily in this process. The brazing metal used in the above process may be an active brazing metal or a brazing metal containing no such an active metal.

Preferably, the joining is substantially effected by utilizing mechanical joining such as press fitting, shrinkage fitting, or expansion fitting, because when the joining is effected only between the outer peripheral surface of the projection of the ceramic member and the inner peripheral surface of the recess of the metallic member at the contacting surfaces thereof, residual stress which would be caused by mutual interference between the projection and the recess, which results from differences in thermal expansion or thermal shrinkage between the ceramic member and the metallic member, is removed.

The limitation of the joined portion to the above location is effected by arranging the intermediate member or the space between the bottom surface of the recess and the tip end surface of the projection.

Further, when the joining is substantially effected by press fitting, a desired space can be provided between the tip end surface of the projection and the bottom surface of the recess. Thus, such joining is preferred.

Furthermore, when the joining is substantially effected by press fitting, as disclosed by NGK Insulators, Ltd. in Japanese Patent Application No. 61-285,974, when the ceramic member and the metallic member are placed in a vessel, and are press fitted together under reduced pressure of about 10 Torr, compressed air is not left in the space formed between the projection of the ceramic member and the recess of the metallic member. Thereby, a more reliable, joined composite body can be obtained. Thus, such joining is preferred.

Any ceramic material may be used as the ceramic material constituting the metal-ceramic joined, composite bodies according to the present invention. When practical applicability is taken into consideration, at least one ceramic material selected from the group consisting essentially of silicon nitride, silicon carbide, sialon, zirconia, alumina, mullite, aluminum titanate, and cordierite is preferred. Which ceramic material or materials should be used among them may be determined depending upon use purposes of the metal-ceramic joined, composite bodies according to the present invention and kinds of metallic members and brazing metals to which the ceramic members are to be joined.

As the metallic material constituting the metal-ceramic composite body according to the present invention, a metallic material having a coefficient of thermal expansion near that of the ceramic material used is preferably selected. Particularly, as the metallic material to be joined to the ceramic material having excellent strength at high temperatures, for instance, silicon nitride, silicon carbide, sialon, etc., Incoloy 903 (trade name), Incoloy 909 (trade name), Koval (trade name) or the like is preferably selected. When the metal-ceramic joined, composite body according to the present invention is applied as a rotary shaft, such as a turbocharger rotor, rotating at high speeds at high temperatures, Incoloy 903 or Incoloy 909 which has a higher strength than that of Koval is preferably selected as the metallic material. In Table 1, coefficients of thermal expansion of carbon steel and SNCM 439 (JIS) as ordinary metallic materials, as well as coefficients of thermal expansion and tensile strength of Incoloy 903, Incoloy 909 and Koval are shown in Table 1.

TABLE 1

| Metallic material | Coefficient of thermal expansion (room temperature ~500° C.) 1/°C. | Tensile strength (kg/mm$^2$) |
| --- | --- | --- |
| Incoloy 903 | $8.0 \times 10^{-6}$ | 110 |
| Incoloy 909 | $8.0 \times 10^{-6}$ | 105 |
| Koval | $6.0 \times 10^{-6}$ | 70 |
| Carbon steel | $14 \times 10^{-6}$ | — |
| SNCM 439 | $14 \times 10^{-6}$ | — |

The present invention will be explained in more detail with references to the attached drawings.

FIGS. 1a through 1d are partially sectional views illustrating metal-ceramic joined, composite bodies according to the first aspect of the present invention. In each of the joined, composite bodies, a projection 2 of a ceramic member 1 is joined to a recess 5 of a metallic member 4, and a stepped portion 3 is formed to increase the inner diameter of the recess 5 toward an opening portion thereof. A brazing metal is placed in a gap between the stepped portion 3 and the projection 2 at the time of the joining.

In the embodiment of FIG. 1a, the entire inner surface of the recess 5 of the metallic member 4 at a joining position is plated with Ni, and the joining is effected by using an active brazing metal 6. Thereby, the entire contacting surfaces between the inner surface of the recess 5 and the outer surface of the projection 2 of the ceramic member 1 are substantially brazed. When an ordinary Ag-Cu brazing alloy containing no active metal is used, the inner surface of the recess 5 is coated with Ni, a metallizing layer is formed on the entire outer surface of the projection 2 at the joining position, and the metallizing layer is plated with Ni. Thereby, similar joining can be effected.

In the embodiment of FIG. 1b, after at least the inner peripheral surface of the recess 5 at the joining position is plated with Ni, and a tip end surface 9 of the projection 2 is coated with graphite as a material having no joinability to the brazing metal, joining is effected with the active brazing metal 6. Thereby, the joining is substantially effected by brazing the inner peripheral surface of the recess 5 to the outer peripheral surface of the projection 2 at the contacting surface thereof, while a space 7 is provided between the bottom surface of the recess 5 and the tip end surface 9 of the projection 2 to prevent joining therebetween.

In the embodiment of FIG. 1c, at least the inner peripheral surface of the recess 5 to be joined is plated with Ni, the tip end surface 9 of the projection 2 is coated with graphite, and a graphite felt 8 as a low elasticity intermediate member made of a material having no joinability to the brazing metal is provided contacting the tip end surface 9 of the projection 2 above the bottom surface of the recess 5. Then, the joining is effected by using an active brazing metal 6. Thereby, joining is substantially effected by brazing the inner peripheral surface of the recess 5 to the outer peripheral surface of the projection 2 at contacting surfaces thereof, while the bottom surface of the recess 5 is not joined to the tip end surface of the projection 2.

In the embodiment shown in FIG. 1d, the inner surface of the stepped portion 3, provided at the opening portion of the recess 5, is plated with Ni at at least a joining portion before press fitting, press fitting is then carried out, and an active brazing metal is arranged between the stepped portion 3 and the projection 5 and is heated up to a brazing temperature of the brazing metal to effect brazing. Thereby, the active brazing metal 6 is provided between the inner surface of the stepped portion 3 in the recess 5 and the outer peripheral surface of the projection 2. Alternatively, the inner peripheral surface of the stepped portion 3 may be plated with Ni at at least the portion to be brazed after the press fitting. Further, the brazing metal may be arranged between the stepped portion 3 and the projection 5 by arranging the brazing metal at a desired location and then effecting the press fitting, or by arranging the brazing metal therein after the press fitting. Furthermore, the above brazing may be carried out by flowing the molten brazing metal between the stepped portion 3 and the projection 5 after the press fitting.

Among the above-mentioned embodiments, in FIGS. 1a, 1b, and 1c, a gap "g" between the inner peripheral surface of the recess and the outer peripheral surface of the projection at the brazing temperature is not more than 300 μm and, more preferably not more than 150 μm. If the gap "g" is more than 300 μm, joining the strength is small. Further, if the molten brazing metal is penetrated by utilizing the above-mentioned capillary action, a rising height of the brazing metal decreases when the gap is more than 300 μm so that a desired joining distance cannot be attained. Thus, more than 300 μm is not preferred. On the other hand, a gap "G" between the inner peripheral surface of the stepped portion of the recess and the outer peripheral surface of the projection at the brazing temperature is preferably 1.5 to 4 times, more preferably 2 to 3 times as much as "g".

In the embodiment of FIG. 1d, the gap "G" is preferably 100 to 1,200 μm, and more preferably 200 to 800 μm.

If "G" is more than 4 times as much as "g" in the embodiments in FIGS. 1a through 1d, the thickness of the metallic member becomes smaller, such that durability may be poor.

FIGS. 2a through 2d are partially sectional views illustrating the metal-ceramic joined, composite bodies according to the second aspect of the present invention. In the embodiments of FIGS. 2a through 2c, a projection 12 of a ceramic member 11 and a recess 14 of a metallic member 13 are joined together by using an active brazing metal 15 or a brazing metal 15 containing no active metal. A groove 16 is formed along the entire periphery of the projection 12, corresponding to the vicinity of an end of the joined portion, and the same brazing metal 15 used for the joining is provided in the groove 16, continuing the joined portion. Thereby, the brazing metal 15 is provided in the groove 16 such that the brazing metal is located at least between the edge 17 of the groove 16 and the recess 14.

In the embodiment shown in FIG. 2a, after the entire inner surface of the recess 14 of the metallic member 13 is plated with Ni at a joining portion, the joining is effected by using the active brazing metal 15. Thereby, the inner surface of the recess 14 is substantially entirely brazed to the exterior of the projection 12 of the ceramic member 11 at contacting surfaces thereof. When a brazing metal containing no active metal, such as an ordinary Ag-Cu brazing alloy, is used, a metallizing layer is formed on the entire outer surface of the projection 12 at the joining portion after the inner surface of the recess 14 is plated with Ni as mentioned above, and the metallizing layer is plated with Ni. Thereby, similar joining can be attained.

In the embodiment shown in FIG. 2b, at least the inner peripheral surface of the recess 14 is plated with Ni at the joining position, graphite as a material having no joinability to the brazing metal is coated onto the tip end surface of the projection 12, and the ceramic member and the metallic member are joined together by brazing only between the outer peripheral surface of the projection 12 and the inner peripheral surface of the recess 14 with use of the brazing metal 15, and a space 18 is provided between the bottom surface of the recess 14 and the tip end surface of the projection 12 while the bottom surface of the recess 14 is not joined to the tip end surface of the projection 12.

In the embodiment of FIG. 2c, at least the inner peripheral surface of the recess 14 is plated with Ni at the joining position, a graphite felt 19, as a low elasticity intermediate member made of a material having no joinability to the brazing metal, is positioned on the bottom surface of the recess 14, and an active brazing metal, in which Ti is vapor deposited onto the surface of a plate of an Ag-Cu brazing alloy, is placed on the graphite felt 19. After the tip end surface of the projection 12 is coated with graphite, an assembly to be joined is formed by inserting the projection 12 inside the recess 14. Next, the brazing metal is melted by heating the assembly in vacuum, so that the molten brazing metal is penetrated into the joining position by utilizing capillary action. Thereby, the outer peripheral surface of the projection 12 is joined only to the inner peripheral surface of the recess 14, while the bottom surface of the recess 14 is not joined to the tip end surface of the projection 12.

In the embodiment shown in FIG. 2d, the projection 12 of the ceramic member 11 is joined to the recess 14 of the metallic member 13 by mechanical joining such as press fitting. A groove 16 is formed along the entire periphery of the projection 12 in the vicinity of the end of the joined portion, and an active brazing metal 15 is provided in the groove 16 such that the brazing metal 15 is interposed at least between an edge 17 of the groove 16 and the recess 14. In this embodiment, the recess 14 may be plated with Ni at a position to be brazed before or after the mechanical joining. Further, the brazing metal may be arranged in the groove 16 at a desired position before the joining, or after the joining, if possible. Furthermore, the brazing is effected by flowing the molten brazing metal between the groove 16 and the recess 14 after the mechanical joining.

As shown in FIGS. 2b and 2c, the bottom surface of the recess 14 is not in direct contact with the tip end surface of the projection 12 by the space 18 or the intermediate member made of the graphite felt 19. In such a structure, stress concentration which would occur when the bottom surface of the recess 14 contacts with or is joined to the tip end surface or the projection 12 can be prevented.

As shown in an enlarged scale in FIGS. 3a and 3b, the groove 16 has only to be covered with the brazing metal 15 at at least the edge 17. That is, the brazing metal 15 may be present at a portion of the groove 16 as shown in FIG. 3a, or the brazing metal may be present in the entire groove 16. However, the brazing metal 15 is preferably present in the entire groove 16 as shown in FIG. 3b, because slip-out resistance and cushioning effects increase, and stress concentration can be reduced in this case.

Specific embodiments of the present invention will be explained below.

EXPERIMENT 1

(First and Second aspects of the present invention)

Metal-ceramic joined, composite bodies according to the present invention as shown in FIGS. 1a through 1c were produced. A process for producing them will be explained below.

An 18 mm-diameter round rod made of solution-treated Incoloy 903 was formed with a recess 5 having an inner diameter of 11.05 mm and a depth of 8 mm, and a small diameter portion having a diameter of 12 mm on one end portion. A stepped portion 3 was formed around the entire inner periphery of the recess at an opening portion, thereby obtaining a metallic member 4. A ceramic member 1 was produced by forming a projection 2 on one end of a silicon nitride, sintered body obtained by pressureless sintering. The projection 2 had a diameter of 11.0 mm and a length of 10 mm. The stepped portion 3 was worked at a position inwardly spaced from the opening end of the recess by 2.5 mm to give a gap "G".

A bottom corner of the recess 5 was beveled at C0.2, and a corner of the open end was tapered. Similarly, an edge of the tip end of the projection 2 was tapered at C0.5, and a base portion thereof was rounded at R2.

By using the metallic members and the ceramic members thus obtained, together with an active brazing metal in which Ti was vapor deposited on a 0.1 mm thick Ag-Cu brazing alloy plate in a thickness of 2 μm, metal-ceramic joined, composite bodies according to the present invention were obtained by the method shown in any of FIGS. 1a, 1b, or 1c.

In that case, the thickness of the Ni plating in FIGS. 1a through 1c was 10 μm, and that of a graphite felt 8 used as an intermediate member in FIG. 1c was 0.4 mm. In FIGS. 1a through 1c, the thickness of "g" was set at 150 μm.

Next, a metal-ceramic joined, composite body as shown in FIG. 1d was produced. A producing process thereof will be shown below. First, the ceramic member and the metallic member were prepared. The ceramic member was made of the same material in the same shape as in the case of the ceramic member used in the joined composite bodies shown in FIGS. 1a through 1c. The metallic member was made of the same material as that of the same metallic member as used in the joined, composite body shown in FIGS. 1a through 1c, but differed from the latter metallic member in that the inner diameter of the recess 5 was 10.9 mm.

By using the metallic member and the ceramic member together with an active brazing metal on which Ti was vapor deposited, a metal-ceramic joined, composite body according to the present invention was obtained by the method shown in FIG. 1d. At that time, the thickness of an Ni plating was 10 μm.

On the other hand, as shown in FIGS. 4a and 4b, Comparative Example 1 and Comparative Example 2 were prepared. Comparative Example 1 comprised a metallic member and a ceramic member having the same shapes as those of the metallic members and the ceramic members as shown in FIGS. 1a through 1c, respectively, but had no stepped portion and the entire inner surface of the recess 5 was substantially entirely brazed to the outer surface of the projection 2 at contacting surfaces thereof. As shown in FIG. 4b, Comparative Example 2 comprises a metallic member and a ceramic member having the same shapes as those of the metallic member and the ceramic member shown in FIG. 1d, respectively, but have no stepped portion and the projection 2 was press fitted into the recess 5.

The metal-ceramic joined, composite bodies shown in FIGS. 1 and 4 were all brazed by heating them to 850° C. in vacuum, and age-hardening Incoloy 903 under given conditions.

With respect to each of the thus obtained joined, composite bodies, the metallic member 4 was fixed, and a load was applied to the ceramic member 1 by using a bending tester shown in FIG. 5. A bending load at which the ceramic member was fractured was measured as a fracture bending load. Fracture bending loads were determined, while the gap "G" was varied with respect to the joined, composite bodies according to the present invention. In FIG. 5, $l_1 = 40$ mm, and $l_2 = 5$ mm. Results are shown in Table 2.

TABLE 2

| Joining process | Present invention | | Comparative Example | |
|---|---|---|---|---|
| | | Fracture bending load (kg) | | Fracture bending load (kg) |
| | Gap G (μm) | | | |
| Brazing | FIG. 1a | 220 | 52,61 | FIG. 4a | 31 |
| | | 300 | 68,74 | | 43 |
| | | 450 | 66,73 | | 15 |
| | | 600 | 51,66 | | |
| | | 800 | 40,55 | | |
| | FIG. 1b | 220 | 76,92 | | |
| | | 300 | 94,101 | | |
| | | 450 | 86,99 | | |
| | | 600 | 76,84 | | |
| | | 800 | 58,70 | | |
| | FIG. 1c | 220 | 83,93 | | |
| | | 300 | 88,99 | | |
| | | 450 | 92,96 | | |
| | | 600 | 71,80 | | |
| | | 800 | 58,64 | | |
| Press fitting | FIG. 1d | 100 | 75,86 | FIG. 4b | 69 |
| | | 200 | 84,95 | | 47 |
| | | 500 | 93,100 | | |
| | | 800 | 82,98 | | |
| | | 1200 | 75,90 | | |
| | | 1500 | 60,89 | | |

As seen from the results in Table 2, the joined, composite bodies with the stepped portion in the present invention exhibited higher fracture bending loads as compared with the Comparative Examples. The results are summarized in FIGS. 6 and 7.

As is clear from the aforegoing results, the gap "G" between the inner peripheral surface of the stepped portion in the recess and the outer peripheral surface of the projection at the brazing temperature is preferably 1.5 to 4 times, more preferably 2 to 3 times as much as the gap "g".

In the embodiment of FIG. 1d, the gap "G" is preferably 100 to 1,200 μm, and more preferably 200 to 800 μm.

The present invention is not limited to the above-mentioned embodiments, but various modifications, variations and changes could be made. For instance, although the stepped portion is formed in a stepwise manner in FIGS. 1a through 1d, the step may be constituted by a taper or a rounded portion that is outwardly enlarged toward the opening portion of the recess. Further, although the groove has a semicircular section in FIGS. 2a through 2d, needless to say, its sectional shape may arbitrarily be selected.

As is clear from the aforegoing explanation, according to the metal-ceramic joined, composite bodies of the first and second aspect of the present invention, since the stepped portion is provided to increase the inner diameter of the recess of the metallic member at the opening portion of the recess and the brazing metal is placed at least in the gap between the stepped portion and the projection of the ceramic member on joining, or since the groove is formed along substantially the entire periphery of the projection of the ceramic member near the end of the joined portion and the brazing metal is interposed at least between the edge of the groove and the recess of the metallic member, the stress concentration of the ceramic member at the end of the joined portion is reduced by the cushioning action of the brazing metal Thus, high reliability, metal-ceramic joined, composite bodies which are hardly broken due to bending or twisting forces can be obtained.

Further, when a turbocharger rotor in which a turbine vane wheel and a part of a turbine wheel shaft are made of a silicon nitride ceramic, while the remainder being made of a metal having high strength is constituted by the metal-ceramic joined a composite body according to the present invention, reduction in the residual stress and prevention of invasion of corrosive gases such as high temperature waste gases into the joining interface can be attained by the cushioning action of the brazing metal. Thus, the turbocharger rotor having excellent durability and more excellent response and higher efficiency can be obtained.

FIGS. 8a through 8c and FIG. 9 illustrate the third aspect of the present invention.

FIGS. 8a through 8c are partially sectional views illustrating embodiments of the metal-ceramic joined, composite bodies according to the third aspect of the present invention. In each embodiment, a projection 2 of a ceramic member 1 is joined to a recess 5 of a metallic member 4 by brazing with use of a brazing metal 5. When an axial, joined length between the projection 2 and the recess 5 and the outer diameter of the projection 2 are taken as $L_2$ and D, respectively, the requirement of $0.2 \leq L_2/D \leq 0.39$ is met.

In the embodiment shown in FIG. 8a, the entire inner surface of the recess 5 of the metallic member 4 at a position to be joined is plated with Ni, and the joining is effected with use of the active brazing metal 6. Thus, the inner surface of the recess 5 is brazed to the outer surface of the projection 2 of the ceramic member 1 at substantially the entire contact surface. When an ordinary Ag-Cu brazing alloy containing no active metal element is used, the entire inner surface of the recess 5 is plated with Ni as mentioned above, a metallizing layer is formed on the entire outer surface of the projection 2 at a location to be joined, and the metallizing layer is plated with Ni. Thereby, joining can be similarly effected.

In the embodiment shown in FIG. 8b, at least the inner peripheral surface of the recess 5, at a location to be joined, is plated with Ni. Graphite is coated onto the tip end surface of the projection 2, the outer peripheral surface of the projection 2 being joined to the inner peripheral surface of the recess 5 by brazing with use of the active brazing metal 6, and a space 7 is provided between the bottom surface of the recess 5 and the tip end surface of the projection 2.

In the embodiment shown in FIG. 8c, at least the inner peripheral surface of the recess 5 at a location to be joined is plated with Ni. Graphite is coated onto the tip end surface of the projection 2. A graphite felt 8 as a low elasticity intermediate member made of a material not joinable to the brazing metal is placed on the bottom surface of the recess 5. The active brazing metal is placed on the graphite felt to contact the tip end surface of the projection. A joining assembly is formed by inserting the projection 2 into the recess 5. The brazing metal is melted by heating the joining assembly in vacuum, and is permeated into a location to be joined by utilizing capillary action. Consequently, the outer peripheral surface of the projection 2 is joined to the inner peripheral surface of the recess 5 by brazing, while the intermediate member is positioned between the bottom surface of the recess 5 and the tip end surface of the projection 2 to make the bottom surface of the recess 5 to be not joined or directly contacted with the tip end surface of the projection 2.

As shown in FIGS. 8b and 8c, the bottom surface of the recess 5 is not directly contacted or joined with the tip end surface of the projection 2 due to the space 7 or the graphite felt 8. In such a structure, stress concentrations which would occur at the tip end of the projection or near the joined end 20 in the case that the bottom surface of the recess 5 is contacted with or joined to the tip end surface of the projection 2, can preferably be prevented.

Hereinafter, actual experiments for the third aspect of the present invention will be explained.

EXPERIMENT 2

(Third aspect of the invention)

Metallic members 4 were prepared from a round rod made of a solution-treated Incoloy 903 having a diameter of 18 mm. The metallic member had a recess 5 having an inner diameter of 11.05 mm and a depth of 8 mm at one end and a thin shaft portion of 12 mm in diameter. Ceramic members 1 each having a projection 2 at one end were prepared from silicon nitride, sintered bodies obtained by pressureless sintering. The projection 2 had a diameter of 11.0 mm and a length of 10 mm.

A bottom corner of the recess 5 was beveled at C0.2, and its open end corner was tapered. An edge of a tip end of the projection 2 was tapered at C0.5, and its base portion was rounded at R2.

According to the methods shown in FIGS. 8a through 8c, metal-ceramic joined, composite bodies of the present invention and the Comparative Examples were obtained by using an active brazing metal in which Ti was vapor deposited in a thickness of 2 μm upon a Ag-Cu brazing alloy plate of 0.1 mm thickness, while $L_2/D$ values were varied. In FIGS. 8a, to 8c, the thickness of the Ni plating was 10 μm. In the embodiment of FIG. 8c, a graphite felt 8 of 0.4 mm thickness was used as a low elasticity intermediate member having no joinability to the brazing metal.

With respect to each of the joined composite bodies in the present invention and Comparative Examples, a load was applied to the ceramic member 1 while the metallic member 4 was fixed to the bending tester shown in FIG. 5. The bending load at which the projection 2 of the ceramic member 1 was broken from the joined end was measured as a fracture bending load. In FIG. 5, $l_1=40$ mm and $l_2=5$ mm. Results are shown in Table 3 and FIG. 9.

TABLE 3

| $L_2/D$ | Fracture bending load P (kg) | | |
|---|---|---|---|
| | FIG. 8a | FIG. 8b | FIG. 8c |
| 0.45 | 31 | | |
| | 43 | — | — |
| | 15 | | |
| 0.39 | 76 | 126 | 154 |
| | 82 | 144 | 138 |
| | 88 | 132 | 137 |
| 0.35 | 130 | 170 | 164 |
| | 140 | 185 | 179 |
| | 141 | 162 | 175 |
| 0.30 | 153 | | |
| | 135 | — | — |
| | 140 | | |
| 0.25 | 137 | 159 | 176 |
| | 120 | 180 | 173 |
| | 145 | 165 | 163 |
| 0.20 | 101 | 148 | 158 |
| | 124 | 170 | 161 |
| | 130 | 154 | 143 |

Figure 9:
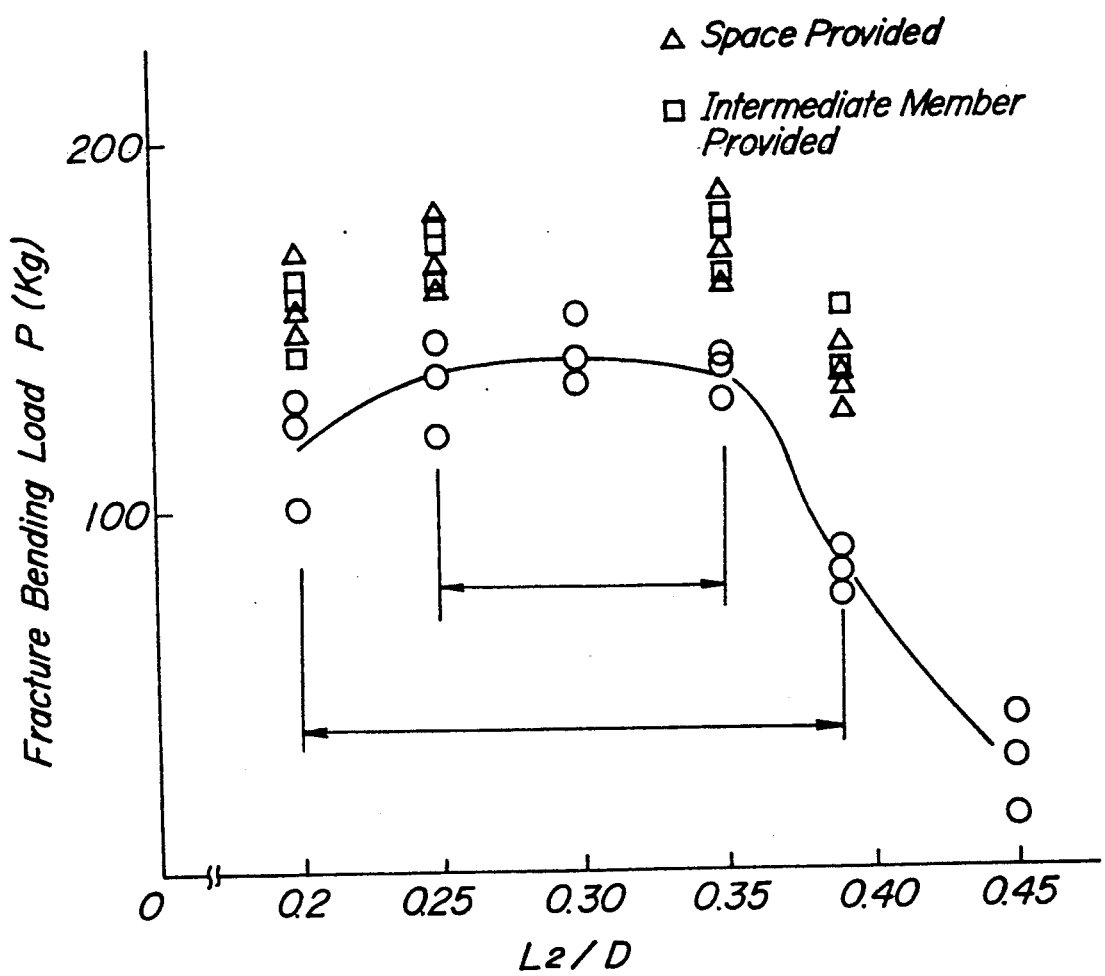
FIG. 9 is a diagram showing results with respect to embodiments according to the third aspect of the present invention.

It is seen from Table 3 and FIG. 9 that the fracture bending load of not less than 70 kg can be obtained when $L_2/D$ is not less than 0.2 but not more than 0.39. $L_2/D$ is preferably not less than 0.25 but not more than 0.35.

As compared with the joined composite bodies shown in FIG. 8a, having the entire, surface-brazed structure, those in FIG. 8b, in which a space was provided between the bottom surface of the recess and the tip end surface of the projection and those shown in FIG. 8c, in which the graphite felt was provided as the low elasticity intermediate member having no joinability to the brazing metal, exhibited higher fracture bending loads.

The present invention is not limited to the above-mentioned embodiments, but various modifications and changes can be made. For example, in the above embodiments, the space or the intermediate member only was provided between the bottom surface of the recess and the tip end surface of the projection. However, the same effect can be obtained by forming a thin film made of a material having no joinability to the brazing material on the tip end surface of the projection of the ceramic member. Also, such an effect can surely be obtained by combining any of the thin film, the space, and the intermediate member.

As is clear from the above-detailed explanation, according to the metal-ceramic joined, composite bodies of the third aspect of the present invention, a stress concentration which is caused by residual stress acting upon the joined end, due to differences in thermal expansion between the metallic member or the ceramic member and the brazing metal, can be reduced by limiting the diameter of the projection, and the joining length. Thus, high reliability, metal-ceramic joined, composite bodies which are difficult to be broken due to bending or twisting can be obtained.

When turbocharger rotors, in which a turbine vane wheel and a part of a turbine shaft are made of silicon nitride ceramic and the remainder is made of a metal having high strength, are constituted by the metal-ceramic joined, composite bodies according to the present invention, residual stress can be reduced. Therefore, the turbocharger rotors having excellent durability and excellent response can be obtained.

What is claimed is:

1. A metal-ceramic joined, composite body in which a projection formed on a ceramic member is inserted into a recess formed in a metallic member, the projection being integrally joined in the recess by a material interposed between the projection and a surface defining the recess, said material consisting of a brazing metal wherein the joining is effected only between a radial outer peripheral surface of the projection and an inner peripheral surface of the recess and fulfills the following relationship:

$$0.2 \leq \frac{L_2}{D} \leq 0.39$$

in which $L_2$ and D are an axial length of a joined portion between the recess and the projection, and a diameter of the projection, respectively.

2. A metal-ceramic joined, composite body comprising a metallic member provided with a recess, and a ceramic member provided with a projection, the metallic member and the ceramic member being integrally joined by inserting the projection into the recess, wherein a groove is provided over substantially an entire periphery of the projection in a vicinity of an opening portion of the recess, a material is interposed at least between an edge of said groove and the recess, the material consisting of a brazing metal and the joining is effected only between a radial outer peripheral surface of the projection and an inner peripheral surface of the recess.

3. A metal-ceramic joined, composite body comprising a metallic member provided with a recess, and a ceramic member provided with a projection, the metallic member and the ceramic member being integrally joined by inserting the projection into the recess, wherein the recess is provided with a stepped portion to increase an inner diameter of the recess at an opening portion of the recess, a material being is interposed at least in a gap between the stepped portion and the projection, the material consisting of a brazing metal, a joining surface between the projection and the recess is substantially concentric to a rotational axis of the metal-ceramic joined, composite body and the joining is effected only between a radial outer peripheral surface of the projection and an inner peripheral surface of the recess.

4. A metal-ceramic joined, composite body comprising a metallic member provided with a recess and a ceramic member provided with a projection, the metallic member and the ceramic member being integrally joined by inserting the projection into the recess, wherein a groove is provided over substantially an entire periphery of the projection in a vicinity of an opening portion of the recess, a material is interposed at least between an edge of said groove and the recess, the material consisting of a brazing metal, a joining surface between the projection and the recess is substantially concentric to a rotational axis of the metal-ceramic joined, composite body and the joining is effected only between a radial outer peripheral surface of the projection and an inner peripheral surface of the recess.

5. A metal-caramic joined, composite body comprising a metallic member provided with a recess, and a ceramic member provided with a projection, the metallic member and the ceramic member being integrally joined by inserting the projection into the recess, wherein the recess is provided with a stepped portion to increase an inner diameter at an opening portion thereof, a material is interposed at least in a gap between the stepped portion and the projection, said material consisting of a brazing metal, and said joining is effected only between a radial outer peripheral surface of the projection and an inner peripheral surface of the recess.

6. The metal-ceramic joined, composite body of claim 5, wherein the joining is effected to fulfill the following relationship:

$$0.2 \leq L_2/D \leq 0.39$$

in which $L_2$ and $D$ are an axial length of a joined portion between the recess and the projection and a diameter of the projection, respectively.

* * * * *